Patented Nov. 22, 1932

1,888,794

UNITED STATES PATENT OFFICE

OTTO ERNST AND OTTO NICODEMUS, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

PROCESS OF PREPARING SALTS OF THE CHLOROETHANE SULPHONIC ACID

No Drawing. Application filed August 28, 1930, Serial No. 478,548, and in Germany September 5, 1929.

The present invention relates to a process of preparing salts of the chloroethane sulphonic acid.

We have found that ethylene dichloride can be caused to react with solutions of salts of the sulfurous acid in such a manner that mainly only one atom of chlorine is exchanged and salts of the chloroethane sulphonic acid are produced. This result is quite surprising because, as is known, each of the two atoms of chlorine of the ethylene chloride is just as labile and exchangeable as the other, which fact may be seen, for instance, from the reaction with alkalies or potassium cyanide.

Contrary thereto it is possible to obtain well defined salts of the chloroethane sulphonic acid from ethylene dichloride and a metal salt of the sulfurous acid, by causing the two components in a dissolved or finely suspended state to react together at a temperature which advantageously does not exceed 90° C. Among the substances which may be used as solvents, dilute alcohol has been found to be appropriate. In order to accelerate the reaction, the reaction may be conducted in the presence of a metal or a metal compound capable of accelerating the halogen exchange, such as copper, copper chloride or barium chloride. It is advantageous to use an excess of ethylene dichloride in order to avoid as far as possible the formation of ethane disulfonates. The reaction may be carried out with or without the application of a raised pressure.

The metal salts of the chloroethane sulphonic acid thus obtained are bodies which crystallize well and are valuable intermediate products for introducing into compounds, for instance, into dyestuffs containing hydroxy groups or amino groups the residue of the ethane sulphonic acid, the ethyl sulfo group for conferring on the compound a good solubility. The free chloroethane sulphonic acid or the chloride thereof may be obtained from the salts according to known general methods.

The following examples serve to illustrate the invention, but they are not intended to limit it thereto, the parts being by weight:

(1.) 100 parts of ethylene dichloride and 250 parts of crystallized sodium sulfite are heated with 400 parts of water and 400 parts of ethyl alcohol in a reflux apparatus, the reaction vessel of which being made of copper, until the ethylene chloride has disappeared. The alcohol and water are then distilled and the remaining salt is extracted with alcohol. On cooling the extract there is obtained a salt crystallizing in laminæ having a mother-of-pearl luster; the content of chlorine of the salt is on an average 17.5–18.5 per cent.; about 80–85 per cent of the salt consists of sodium chloroethane sulfonate. This product is sufficiently pure for most reactions; by a repeated recrystallization from dilute alcohol it can easily be freed from the admixed ethane disulfonate amounting to about 10–20 per cent.

(2.) 158 g. of potassium sulfite and 120 g. of ethylene dichloride are heated to boiling for 15 hours in a reflux apparatus while thoroughly stirring, together with 1200 cc. of water and 400 cc. of methanol to which some pulverized copper has been added. The reaction liquid is distilled until ethylene dichloride and methanol no longer pass over and is finally evaporated to dryness. 250 g. of dry substance containing 40 per cent of potassium chloroethane sulfonate are obtained. This crude product can already be used for many reactions. By extraction with alcohol there is obtained therefrom the pure potassium chloroethane sulfonate crystallizing in colorless laminæ.

(3.) 104 g. of magnesium sulfite and 120 g. of ethylene dichloride are boiled for 20 hours in the reflux apparatus together with 2 liters of water and 400 cc. of methanol. The unchanged, sparingly soluble magnesium sulfite is separated by filtering by suction and the filtrate is then treated as described in Example 2. The crude product obtained contains magnesium chloroethane sulfonate which may likewise be obtained in a pure state of extraction of the product with alcohol.

(4.) In a manner analogous to that described in the preceding examples 195 g. of crystallized zinc sulfite and 120 g. of ethylene dichloride are boiled for 20 hours together with 1800 cc. of water and 400 cc. of methanol to which some copper sulfate has been added. The unchanged zinc sulfite is then separated by filtering by suction. Methanol and the excess of ethylene dichloride are distilled and the whole is evaporated to dryness. The crude product obtained contains 35 per cent of zinc chloroethane sulfonate which may be purified as usual.

We claim:

1. The process which comprises causing a solution of ethylene dichloride to react, while refluxing the vapors evaporated from the reaction mixture, with a solution of a sulfurous acid salt of a metal selected from the group consisting of Na, K, Ca, Mg, at a temperature below 90° C., wherein ethylene dichloride is used in excess, and then separating the chloroethane sulfonate produced.

2. The process which comprises causing an aqueous alcoholic solution of ethylene dichloride to react, while refluxing the vapors evaporated from the reaction mixture, with an aqueous alcoholic solution of a sulfurous acid salt of a metal selected from the group consisting of Na, K, Ca, Mg, at a temperature below 90° C. wherein ethylene dichloride is used in excess, and then separating the chloroethane sulfonate produced.

3. The process which comprises causing an aqueous alcoholic solution of ethylene dichloride to react, while refluxing the vapors evaporated from the reaction mixture, with an aqueous alcoholic solution of a sulfurous acid salt of a metal selected from the group consisting of Na, K, Ca, Mg, at a temperature below 90° C. in the presence of a metal catalyst accelerating the halogen exchange and selected from the group consisting of copper, copper chloride and barium chloride wherein ethylene dichloride is used in excess, and then separating the chloroethane sulfonate produced.

4. The process which comprises causing an aqueous alcoholic solution of ethylene dichloride to react, while refluxing the vapors evaporated from the reaction mixture, with an aqueous alcoholic solution of sodium sulfite at a temperature below 90° C. in the presence of a metal catalyst accelerating the halogen exchange and selected from the group consisting of copper, copper chloride and barium chloride, wherein ethylene dichloride is used in excess, and then separating the chloroethane sulfonate produced.

5. The process which comprises causing an aqueous alcoholic solution of ethylene dichloride to react, while refluxing the vapors evaporated from the reaction mixture, with an aqueous alcoholic solution of sodium sulfite at a temperature below 90° C. in the presence of copper metal, wherein ethylene dichloride is used in excess, and then separating the chloroethane sulfonate produced.

6. The process which comprises causing a suspension of finely divided ethylene dichloride to react, while refluxing the vapors evaporated from the reaction mixture, with a suspension of a finely divided sulfurous acid salt of a metal selected from the group consisting of Na, K, Ca, Mg, at a temperature below 90° C., wherein ethylene dichloride is used in excess, and then separating the chloroethane sulfonate produced.

7. The process which comprises causing an aqueous alcoholic suspension of finely divided ethylene dichloride to react, while refluxing the vapors evaporated from the reaction mixture, with an aqueous alcoholic suspension of a finely divided sulfurous acid salt of a metal selected from the group consisting of Na, K, Ca, Mg, at a temperature below 90° C. wherein ethylene dichloride is used in excess, and then separating the chloroethane sulfonate produced.

8. The process which comprises causing an aqueous alcoholic suspension of a finely divided ethylene dichloride to react, while refluxing the vapors evaporated from the reaction mixture, with an aqueous alcoholic suspension of a finely divided sulfurous acid salt of a metal selected from the group consisting of Na, K, Ca, Mg, at a temperature below 90° C. in the presence of a metal catalyst accelerating the halogen exchange and selected from the group consisting of copper, copper chloride and barium chloride wherein ethylene dichloride is used in excess, and then separating the chloroethane sulfonate produced.

9. The process which comprises causing an aqueous alcoholic suspension of finely divided ethylene dichloride to react, while refluxing the vapors evaporated from the reaction mixture, with an aqueous alcoholic suspension of sodium sulfite at a temperature below 90° C. in the presence of copper metal, wherein ethylene dichloride is used in excess, and then separating the chloroethane sulfonate produced.

In testimony whereof, we affix our signatures.

OTTO ERNST.
OTTO NICODEMUS.